(12) United States Patent
Ukita

(10) Patent No.: US 6,879,367 B2
(45) Date of Patent: Apr. 12, 2005

(54) TERMINALS HAVING MEANDERING PORTIONS LIQUID CRYSTAL DISPLAY INCLUDING LEAD WIRES FOR CONNECTING CIRCUIT WIRING TO CONNECTIONAL

(75) Inventor: Tooru Ukita, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 78 days.

(21) Appl. No.: 10/284,306

(22) Filed: Oct. 31, 2002

(65) Prior Publication Data
US 2003/0086048 A1 May 8, 2003

(30) Foreign Application Priority Data
Nov. 2, 2001 (JP) ........................................ 2001-337821

(51) Int. Cl.[7] ............................................ G02F 1/1345
(52) U.S. Cl. ...................................... 349/149; 349/152
(58) Field of Search ................................ 349/149–152

(56) References Cited

U.S. PATENT DOCUMENTS 5,652,632 A * 7/1997 Shimizu ...................... 349/40
6,088,073 A * 7/2000 Hioki et al. .................. 349/40
6,300,997 B1 * 10/2001 Saito et al. .................. 349/149
6,356,320 B1 * 3/2002 Chung et al. ................. 349/54

FOREIGN PATENT DOCUMENTS

| JP | 10-153791 | 6/1998 |
| JP | 2000-56724 | 2/2000 |

* cited by examiner

Primary Examiner—Tarifur R. Chowdhury
(74) Attorney, Agent, or Firm—McGinn & Gibb, PLLC

(57) ABSTRACT

A plurality of connecting terminals 4 orderly arranged in a peripheral portion 2 of a liquid crystal display panel and scan lines derived from a display pixel portion 1 of the liquid crystal display panel are connected by lead wires 3, respectively. Each lead wire 3 includes a meandering portion 3a, an oblique portion extending in nonparallel direction to the scan line and a parallel portion 3c extending in substantially the same direction of the scan line. The meandering portions 3a include a plurality of bent portions, respectively. The number of the bent portions of each meandering portion 3a is regulated correspondingly to a distance between corresponding connecting terminal 4 and wiring of the display pixel portion 1 such that electric resistance of the lead wire 1 becomes within a predetermined range.

7 Claims, 5 Drawing Sheets

US 6,879,367 B2

TERMINALS HAVING MEANDERING PORTIONS LIQUID CRYSTAL DISPLAY INCLUDING LEAD WIRES FOR CONNECTING CIRCUIT WIRING TO CONNECTIONAL

BACKGROUND OF THE INVENTION

1. Field of the Invention

The present invention relates to a liquid crystal display and, particularly, to a configuration of lead portions provided in a peripheral portion of a display panel of the liquid crystal display.

2. Description of the Prior Art

The liquid crystal display is used popularly as a flat panel display, which is thin, lightweight and low power consumption. A conventional liquid crystal display is constructed with a liquid crystal display panel having a display pixel portion for displaying a desired image on the basis of scan signals and data signals inputted to scan lines and signal lines thereof and a peripheral portion arranged in a peripheral portion of the display pixel portion as a frame. In the peripheral portion, connecting terminals are arranged so that terminals of a TCP (Tape Carrier Package) with a drive IC for supplying the scan signals and the data signals are connected thereto. And lead wires are arranged for connecting the connecting terminals to the scan lines and the signal lines for a display area.

A liquid crystal of the liquid crystal display is sealed in between opposing substrates of the liquid crystal display panel by a liquid crystal sealing member. The liquid crystal sealing member is also positioned in the peripheral portion of the liquid crystal display and crosses the lead portions in an overlapping relation.

FIG. 1 is a partially enlarged plan view of the peripheral portion of the conventional liquid crystal display, showing a portion thereof to which one TCP is connected. In FIG. 1, scan lines and data lines derived from a display pixel portion 101 are connected to a plurality of connecting terminals 104 orderly arranged in the peripheral portion through lead wires 103, respectively.

As shown in FIG. 1, one of the lead wires, which is connected to a center one of the connecting terminals 104, is shortest and the length of connecting wire is increased with increase of distance of a corresponding connecting terminal from the center connecting terminal. With such difference in length between the lead wires, resistance values of the lead wires become different. Therefore, degree of deformation of scan signal waveform and the data signal waveform supplied through the lead wires to the display pixel portion becomes different correspondingly to the difference in length between the lead wires even when identical scan signals and data signals are supplied from the connecting terminals to the display pixel portion. Consequently, voltages to be written in respective pixels become uneven, causing luminance of the liquid crystal display panel to be reduced or increased. Unevenness of resistance value of the lead wires connected to the scan lines appears on the panel as horizontal line variation of luminance in a vertical direction and unevenness of resistance value of the lead wires connected to the signal lines appears on the panel as vertical variation of luminance in a horizontal direction.

In order to solve the above problem, it is usual in the conventional liquid crystal display to average resistance values of the lead wires connected to one TCP. For example, width of the lead wire connected to the connecting terminal arranged remote from the center connecting terminal is made large compared with that of the lead wire connected to the center connecting terminal.

JP 2000-56724 A discloses a technique for averaging length of lead wires by forming only one bent portion in each of the lead wires.

There is a recent request of enlargement of an area of a display pixel portion of a liquid crystal display panel and reduction of an area of a peripheral portion, that is, a frame portion, of a liquid crystal display. When, in order to satisfy the request of reduction of the frame area, width of the peripheral portion is reduced, a space for arranging the lead wires is reduced necessarily. Therefore, the prior proposal of width increase of the lead wire or formation of the bent portion becomes impossible in view of possible short-circuit between adjacent lead wires. Consequently, it is necessary to provide other means for equalizing the resistance values of the lead wires.

SUMMARY OF THE INVENTION

An object of the present invention is to provide a liquid crystal display, which is suitable to narrow the frame and is capable of making resistance values of lead wires substantially equal each other.

In order to achieve the above object, a peripheral portion of the liquid crystal display according to the present invention is provided with a group of lead wires each having a meandering portion. The meandering portion of each lead wire according to the present invention is provided to make resistance value of the lead wire within a predetermined range.

Since the meandering portion is provided in the lead wire to make the resistance value thereof within the predetermined range in the present invention, it is possible to equalize the resistance values of the lead wires even when the display pixel portion is wide and the peripheral portion, that is, the frame portion, is narrow. That is, according to the present invention, both of the narrowing of frame and the improvement of the display characteristics of the liquid crystal display can be achieved.

DETAILED DESCRIPTION OF THE PREFERRED EMBODIMENTS

Figure 2:
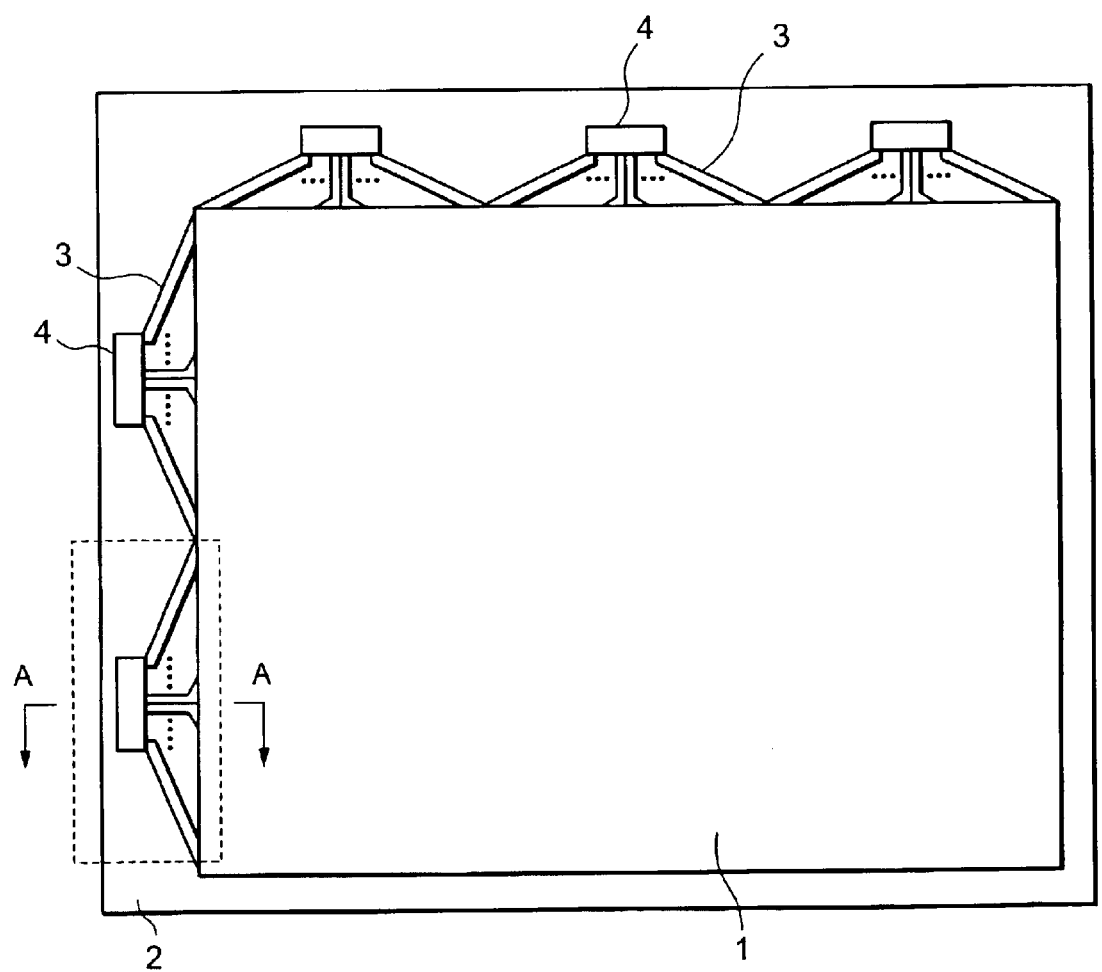
FIG. 2 is a plan view of a liquid crystal display according to the present invention.

A liquid crystal display of the present invention shown in FIG. 2 includes a liquid crystal display panel having a display pixel portion 1 and a peripheral portion 2 surrounding the display pixel portion 1. In FIG. 2, two vertical-side TCPs each having drive ICs for supplying scan signals to scan lines are arranged vertically and three horizontal-side TCPs each having drive ICs for supplying data signals to signal lines are arranged horizontally such that these TCPs are connected to the liquid crystal display panel.

A portion of the liquid crystal display to which one of the vertical side TCPs for supplying the scan signals to the scan lines is connected will be described with reference to FIG. 3, which is an enlarged plan view of a rectangular portion defined by a dotted line in FIG. 2.

A plurality of connecting terminals 4 arranged in order in the peripheral portion 2 of the liquid crystal display panel are connected to the scan lines on the display pixel portion 1 through lead wires 3, respectively. In this embodiment, each of the lead wires 3 includes a meandering portion 3a, an oblique portion 3b extending obliquely to the scan line and a parallel portion 3c extending substantially in parallel to the scan line. As shown in FIG. 3, the meandering portion 3a of the lead wire 3 positioned in a center portion is longest and those of the lead wires 3 positioned in the outermost positions are shortest.

Since the meandering portion 3a is formed by bending a wire repeatedly at small intervals, its resistance value is relatively large and can be regulated by setting the number of bent portions. Therefore, it is possible to make the resistance values of the lead wire connected to the connecting terminal 4 arranged in the center position and the lead wires connected to the connecting terminals 4 positioned outside the center position substantially equal.

Since the oblique portions 3b of adjacent lead wires 3 are arranged in parallel to each other, it is not easy to reduce lengths thereof. However, it is possible to obtain a desired length of the meandering portion 3a by bending the wire of the meandering portion 3a at the small intervals.

Width of the meandering portion 3a may be equal to or narrower than width of the oblique portion 3b as well as the parallel portion 3c. In order to prevent short-circuit between adjacent lead wires, it is preferable that the meandering portion 3a has a plurality of bent portions such that width (e.g., peak-to-peak distance) of the meandering portion is not substantially out of a width range of the corresponding connecting terminal 4, as shown in FIG. 3. When it is impossible to obtain a desired length of the meandering portion 3a, the resistance value thereof can be regulated by regulating the width of the meandering portion 3a.

Figure 4A:
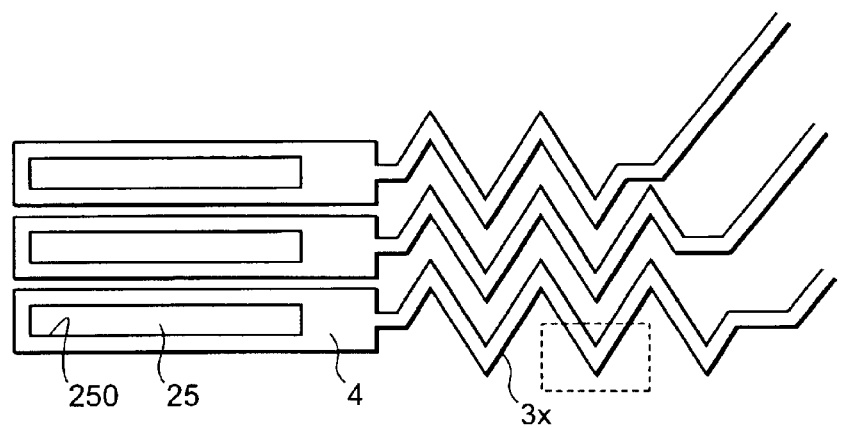
FIG. 4A to FIG. 4C are enlarged plan views of respective embodiments of a lead wire according to the present invention.
Figure 4B:
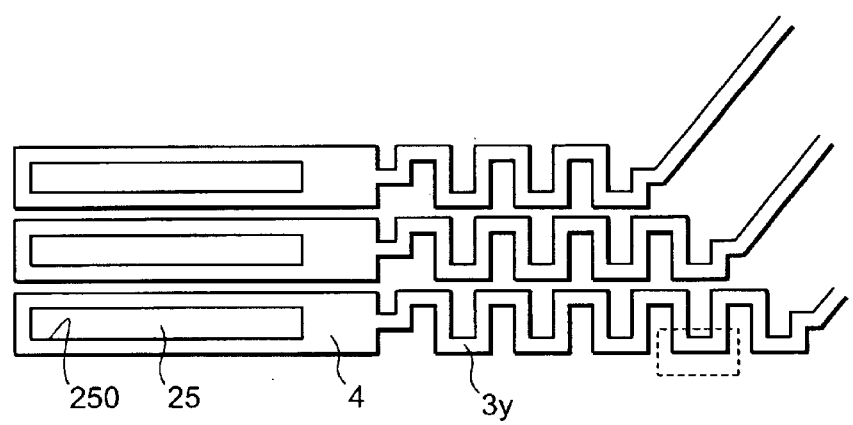
Figure 4C:
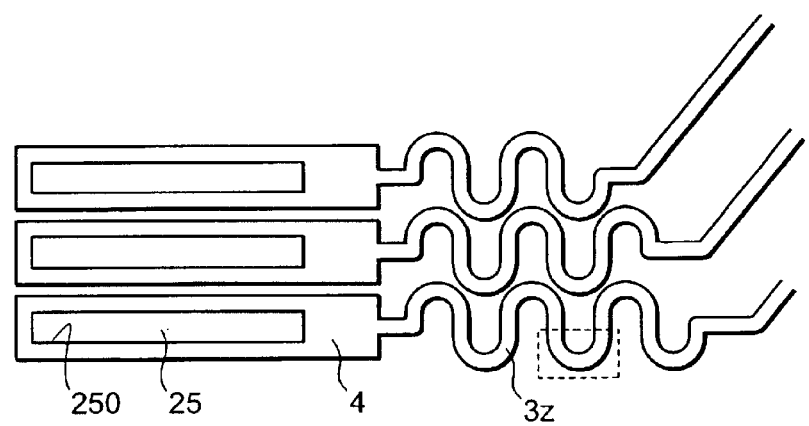

FIG. 4A to FIG. 4C are enlarged plan views of respective embodiments of the lead wire according to the present invention.

In FIG. 4A, the meandering portions 3x of the lead wires, which are close to each other, are arranged in a nesting relation. That is, the meandering portion 3x of one of the lead wires 4 is substantially nested in the meandering portions of adjacent lead wires. In this embodiment, the meandering portion 3x includes a plurality of series connected unit bent sections each having a saw tooth shape defined by a dotted line in FIG. 4A. That is, the meandering portion 3x takes in a sawteeth waveform, peak-to-peak distance being the width of the meandering portion 3x.

In FIG. 4B, the meandering portion 3y includes a plurality of series connected rectangular unit sections each being a rectangular tooth defined by a dotted line. That is, the meandering portion 3y takes in the rectangular waveform, peak-to-peak distance being the width of the meandering portion.

In FIG. 4C, the meandering portion 3z includes a plurality of series connected semicircular unit sections each defined by a dotted line. That is, the meandering portion 3z takes in a sinusoidal waveform, peak-to-peak distance being the width of the meandering portion 3z.

Each of the meandering portions 3x, 3y and 3z is arranged such that it extends in substantially the same direction as that of the scan line as well as the connecting terminal 4. Since the meandering portion is formed by a series connection of the unit sections, short-circuit and/or signal interference between the meandering portions of the adjacent lead wires can be prevented and, further, the pattern design of a reticle for patterning wiring becomes easier. Therefore, cost reduction of the liquid crystal display can be realized.

Figure 5:
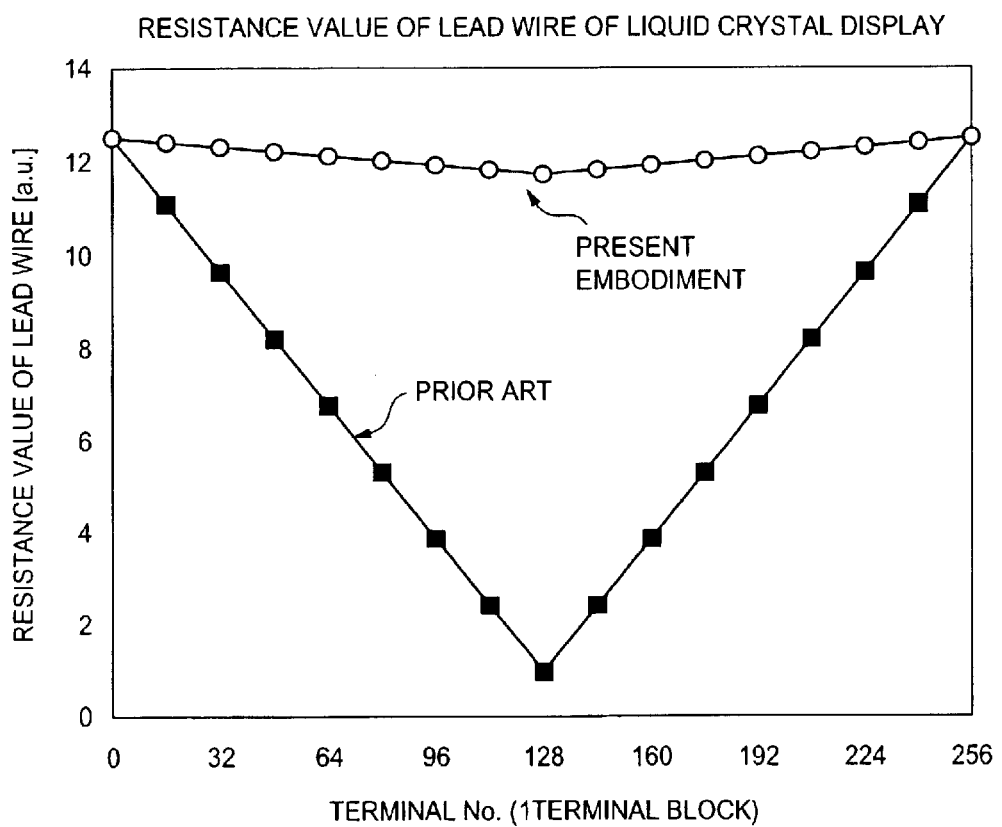
FIG. 5 is a graph showing resistance values of the conventional lead wires and the lead wires of the present invention.

FIG. 5 is a graph showing resistance values of the prior art lead wires and resistance values of the lead wires of the present invention. In FIG. 5, the ordinate indicates unit resistance value of the lead wire and the abscissa indicates numbers assigned to 256 lead wires connected to external connecting terminals, which are connected to one TCP. Since the pitch of the connecting terminals, which is, for example, 80 $\mu$m, is smaller than the pitch of the wiring of the display pixel portion, which is, for example, 300 $\mu$m, distances from the connecting terminals to the wiring of the display pixel portion are different. Therefore, resistance values of the lead wires becomes different when the wiring of the display pixel portion is directly connected to the connecting terminals through lead wires having the same width.

Figure 1:
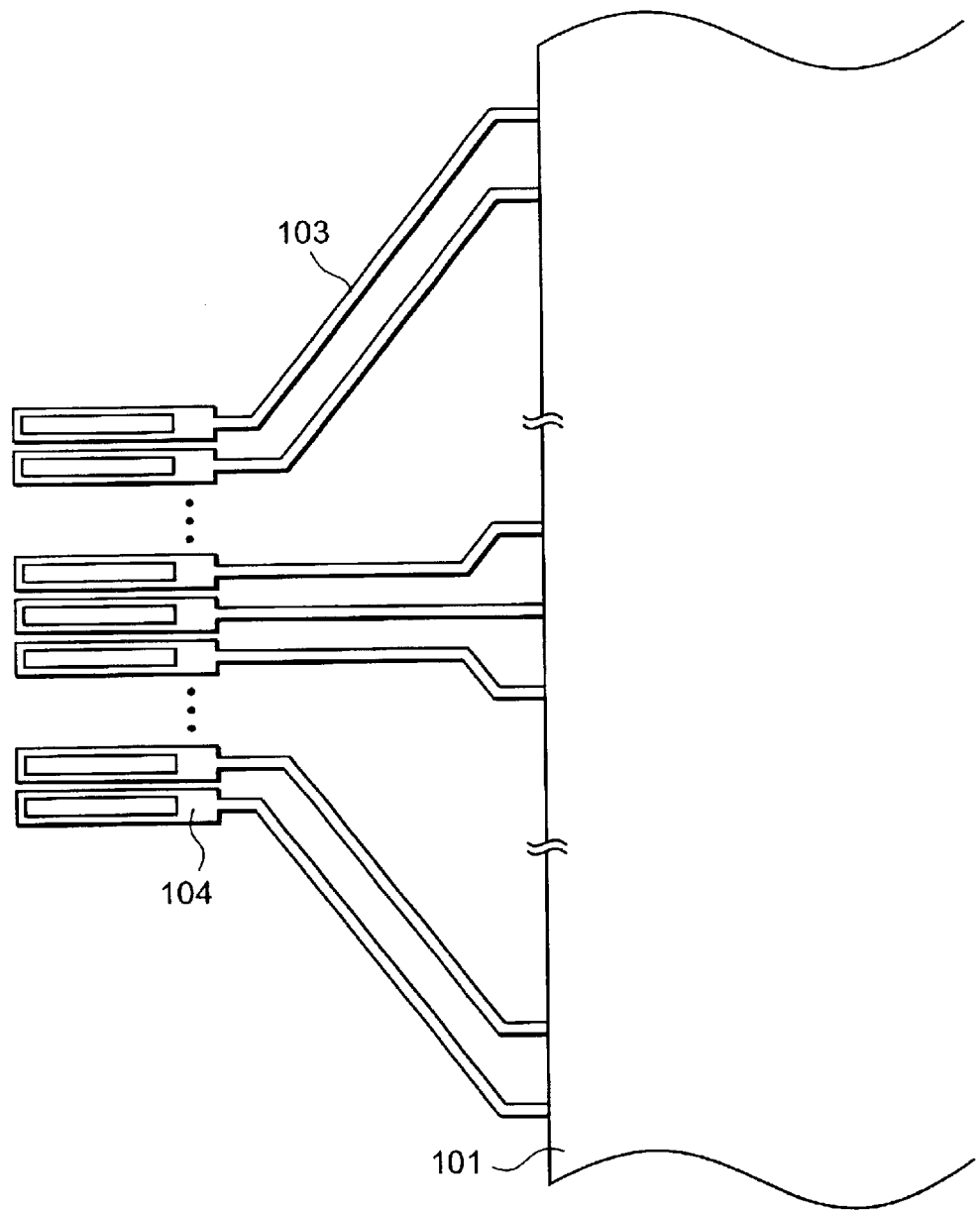
FIG. 1 is a partially enlarged plan view of a conventional liquid crystal display.

As shown in FIG. 5, the resistance value of the prior art lead wire connected to the center portion of the TCP is small since the length of the lead wire is small as shown in FIG. 1 and the resistance value of the prior art lead wire connected to the connecting terminal arranged remote from the center connecting terminal becomes large since the length of the lead wire becomes longer. That is, the resistance value of the prior art lead wire connected to the outermost connecting terminal becomes at least 12 times that of the prior art lead wire connected to the center connecting terminal as shown in FIG. 5. As a result, there is a large difference in waveform of effective signals supplied to the display pixel portion between the lead wires, causing the defect of display such as vertical line variation and/or horizontal line variation to appear on the liquid crystal display panel.

Figure 3:
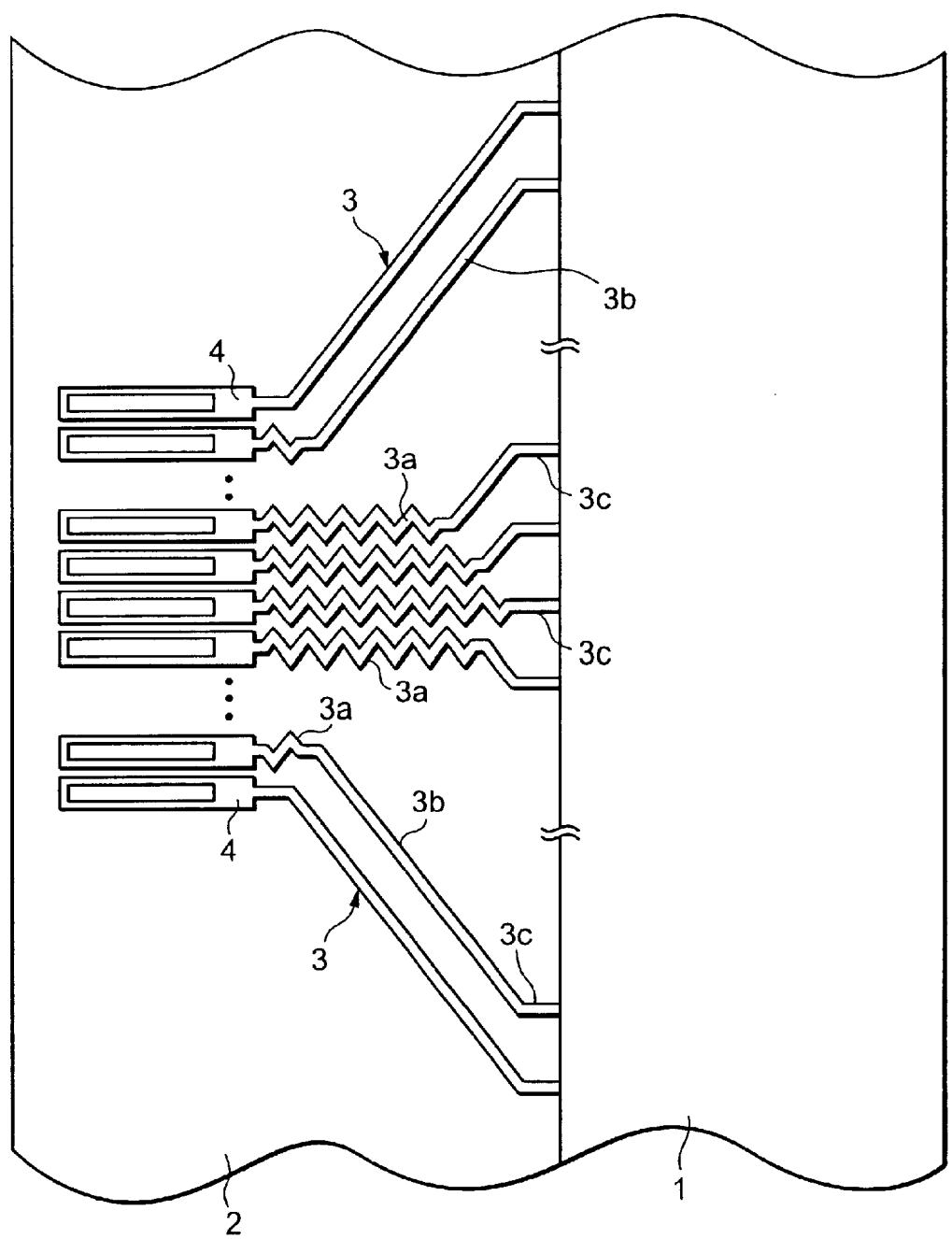
FIG. 3 is an enlarged plan view of a rectangular portion defined by a dotted line in FIG. 2.

On the contrary, according to the present invention in which the meandering portion 3a of the lead wire 3 connecting a connecting terminal arranged closer to the center portion of the TCP is made longer than that connecting a connecting terminal remote from the center position to an outer portion of the TCP as shown in FIG. 3, the resistance values of the lead wires can be substantially equalized regardless of the position of lead wire, as shown in FIG. 5. That is, in a portion in which the distance between the connecting terminal and the display pixel portion is small, the length of the lead wire is maintained by partially meandering the lead wire so that the resistance value thereof becomes substantially equal to that in the portion in which the distance between the connecting terminal and the display pixel portion is largest. As a result, it is possible to equalize the effective signal waveform capable of being supplied to the display pixel portion 1 to thereby restrict generation of vertical and/or horizontal line variation.

Compared with the prior art, the display characteristics of the liquid crystal display panel is improved by equalizing the resistance values of the lead wires in high level. Such high level resistance values does not provide any problem since the influence of deformation or degradation of the signal waveform is restricted by making amplitude of drive signal supplied from the TCP to the external connecting terminals large. Furthermore, it is possible to lower an absolute resistance value of the lead wire by forming it of a material having low resistivity or increasing thickness of a conductive film constituting the lead wire.

Figure 6:
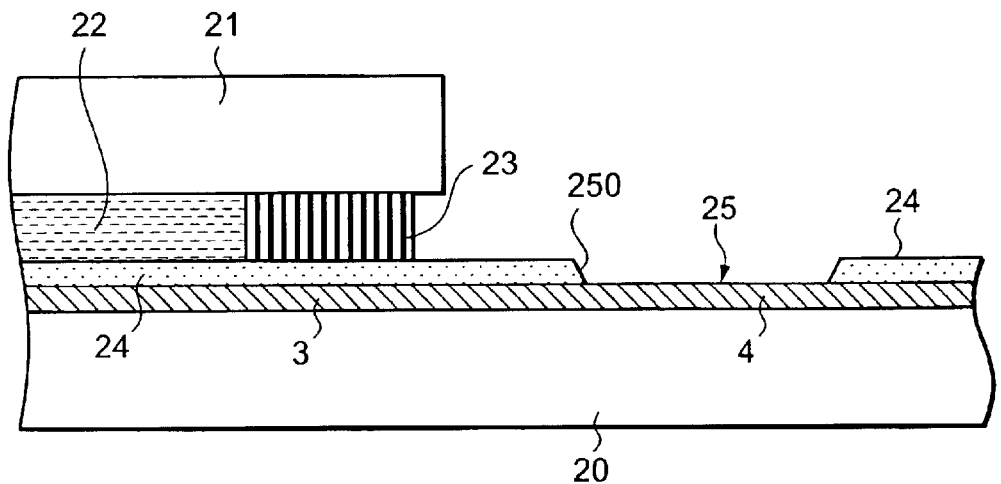
FIG. 6 is a cross section taken along a line A—A in FIG. 2.

FIG. 6 is a cross section taken along a line A—A in FIG. 2. The liquid crystal display is constructed with a glass substrate 20, an opposing glass substrate 21 arranged in an opposing relation to the glass substrate 20 and a liquid crystal layer 22 disposed between the glass substrates 20 and 21 and sealed by a liquid crystal sealing member 23. A plurality of scan lines extending from the display pixel portion to the peripheral portion, the lead wires and the connecting terminals are formed on the surface of the glass substrate 20. The surface of the glass substrate 20 is covered by a protective film 24. In the portion of the connecting terminals 4 in the peripheral portion, the protective film 24 is removed to provide an opening portion 250 for exposing the connecting terminals 4 and surfaces of the connecting terminals exposed in the opening portion constitute a TCP pressure contact portion 25. The scan lines, the lead wires and the connecting terminals may be formed simultaneously by patterning conductive films of chromium, molybdenum, aluminum and ITO formed on the glass substrate 20.

The liquid crystal layer sealing member 23 crosses the lead wires 3 and overlies thereon. In the present invention, the lead wire 3 is arranged such that it overlaps with the liquid crystal layer sealing member 23 in the vicinity of the meandering portion 3a, 3x, 3y or 3z thereof. In arranging the lead wires, the width and/or arrangement of the lead wires may be determined by taking an area of the glass substrate 20, which is covered by the lead wires 3, and an area thereof, which is not covered by the lead wires 3, into consideration. In such case, it is possible to improve the adhesion of the liquid crystal layer sealing member 23 and the uniformity of cell gaps in the whole liquid crystal panel to thereby restrict the display variation and improve the display characteristics of the liquid crystal display.

According to this embodiment, the lead wire 3 includes the meandering portion 3a, 3x, 3y or 3z and length of the meandering portion of the lead wire arranged in the center portion of the TCP is made long and that of the lead wire arranged outside of the center portion is made short. Therefore, it is possible to substantially average the resistance values of the lead wires regardless of their positions to thereby unify the effective signal waveform supplied to the display pixel portion 1 and restrict the horizontal line variation. In other words, even when there is provided large difference in distance between the lead wires connecting the connecting terminals to the display pixel portion due to reduction of the frame width and reduction of pitch of the connecting terminals, it is possible to make the resistance values of the lead wires substantially constant. Therefore, it is possible to restrict generation of display variation due to difference in signal delay between the respective lines caused by resistance values of the lead wires.

Furthermore, since it is possible to regulate the resistance values of a plurality of lead wires 3 between the external connecting terminals 4 connected to the TCP having the drive IC for supplying the scan signal and the display pixel portion 1 in a predetermined range, it is possible to supply scan signals in the same level to the scan lines of the display pixel portion 1 to thereby restrict generation of the horizontal line variation due to difference in luminance in the vertical direction of the panel. In addition thereto, it is possible to make the narrowing of the frame of the panel and reduction of pitch of the connecting terminals compatible.

Although the present invention has been described with reference to the scan line side of the preferred embodiments, the present invention is not limited to them. When the present invention is applied to the connecting wires of the connecting terminals connected to the H side TCP for supplying data signals to the signal lines, the generation of vertical line variation can be prevented and the improvement of the display characteristics and the reduction of the frame can be made compatible.

It should be noted further that the described embodiments could be modified in various manners. For example, although the scan lines, the lead wires and the connecting terminals are formed in a single conductive layer as shown in FIG. 6, the present invention can be applied to a case where these elements are formed in different conductive layers. Furthermore, the present invention can be applied to a case where a single layer wiring derived from the scan lines and a single layer wiring extending from the connecting terminals are overlapped in a portion of the lead wires and electrically connected.

Moreover, a plurality of lead wires 3 may be arranged symmetrically about the extending direction of the scan line as an axis. In such case, since the symmetrical pattern of the lead wires is provided, the pattern design becomes easier and reduction of cost and fabrication time can be realized.

In the described embodiments, the meandering portion of the lead wire is continuously formed by repeating the unit bending of wire. However, the effect of the present invention can be obtained by a meandering portion, which is not continuous or has a straight portion therein. In addition, the basic unit may be smaller or larger than the basic unit defined by the dotted line in FIG. 4.

Furthermore, although, in the described embodiment, the drive IC is the TCP type, the present invention can be applied to a liquid crystal display having drive ICs connected according to COG (Chip On Glass) in which the TCPs are directly mounted on the glass substrate.

As described hereinbefore, according to the present invention in which the meandering portion is provided in the lead wire, it is possible to average resistance values of the whole lead wires even when the display portion of the liquid crystal display panel is wide and the peripheral portion thereof is narrow. That is, the reduction of the frame and the display characteristics can be made compatible by the present invention.

What is claimed is:

1. A liquid crystal display comprising:
   a group of connecting terminals arranged in a peripheral portion of a liquid crystal display panel;
   a group of circuit wirings arranged in a display region of said liquid crystal display panel with a distance between adjacent circuit wirings larger than a distance between adjacent connecting terminals; and
   a group of lead wires, each said lead wire connecting one of said circuit wirings to one of said connecting terminals, said lead wires except at least those positioned at outermost positions having meandering portions each including a plurality of bent portions, respectively, a number of said bent portions being increased with an increase of distance from said lead wires positioned at the outermost position so that resistance values of said respective lead wires are set within a predetermined range, a peak-to-peak distance of said meandering portions being substantially equal to or smaller than a width of a connecting terminal of said connecting terminals.

2. A liquid crystal display as claimed in claim 1, wherein said bent portions of said meandering portions of adjacent ones of the group of said lead wires include series connected rectangular portions.

3. A liquid crystal display as claimed in claim 1, wherein said bent portions of said meandering portions of adjacent ones of the group of said lead wires include series connected semicircular portions.

4. A liquid crystal display as claimed in claim 1, wherein said bent portions of said meandering portions of adjacent ones of the group of said lead wires are arranged in a same direction.

5. A liquid crystal display as claimed in claim 1, wherein resistance values of said lead wires are substantially equal.

6. A liquid crystal display as claimed in claim 1, wherein said liquid crystal display panel includes a pair of opposing substrates and a liquid crystal layer between said opposing substrates and said liquid crystal layer sealing member sealing said liquid crystal layer and said lead wires overlapping said liquid crystal layer sealing member.

7. A liquid crystal display as claimed in claim 6, wherein a ratio of an area of said liquid crystal layer sealing member overlapping said lead wires and other area of said liquid crystal layer sealing member is set within a predetermined range.

* * * * *

UNITED STATES PATENT AND TRADEMARK OFFICE
CERTIFICATE OF CORRECTION

PATENT NO. : 6,879,367 B2
DATED : April 12, 2005
INVENTOR(S) : Tooru Ukita

It is certified that error appears in the above-identified patent and that said Letters Patent is hereby corrected as shown below:

<u>Title page, Item [54] and Column 1, line 1,</u>
Title, please change the title to -- LIQUID CRYSTAL DISPLAY INCLUDING LEAD WIRES FOR CONNECTING CIRCUIT WIRING TO CONNECTING TERMINALS HAVING MEANDERING PORTIONS --

Signed and Sealed this

Fifth Day of July, 2005

JON W. DUDAS
*Director of the United States Patent and Trademark Office*